Aug. 24, 1965 M. NADLER 3,202,965

CHARACTER RECOGNITION SYSTEM

Filed May 31, 1962 10 Sheets-Sheet 1

Inventor:
Morton Nadler
BY Baldwin & Wight
Attorneys

Aug. 24, 1965 M. NADLER 3,202,965

CHARACTER RECOGNITION SYSTEM

Filed May 31, 1962 10 Sheets-Sheet 2

Inventor:
Morton Nadler
BY Baldwin & Wight
Attorneys

Aug. 24, 1965 M. NADLER 3,202,965

CHARACTER RECOGNITION SYSTEM

Filed May 31, 1962 10 Sheets-Sheet 3

Inventor:
Morton Nadler
BY Baldwin & Wight
Attorneys

Aug. 24, 1965 M. NADLER 3,202,965

CHARACTER RECOGNITION SYSTEM

Filed May 31, 1962 10 Sheets-Sheet 4

Inventor:
Morton Nadler
BY Baldwin & Wight
Attorneys

Aug. 24, 1965 M. NADLER 3,202,965

CHARACTER RECOGNITION SYSTEM

Filed May 31, 1962 10 Sheets-Sheet 5

Inventor:
Morton Nadler
By Baldwin & Wight
Attorneys

Aug. 24, 1965 M. NADLER 3,202,965

CHARACTER RECOGNITION SYSTEM

Filed May 31, 1962 10 Sheets-Sheet 6

Inventor:
Morton Nadler
BY Baldwin & Wight
Attorneys

Inventor:
Morton Nadler
BY Baldwin & Wight
Attorneys

Inventor:
Morton Nadler
BY Baldwin & Wight
Attorneys

Aug. 24, 1965 M. NADLER 3,202,965

CHARACTER RECOGNITION SYSTEM

Filed May 31, 1962 10 Sheets-Sheet 9

Inventor:
Morton Nadler
BY Baldwin & Wight
Attorneys

Aug. 24, 1965 M. NADLER 3,202,965

CHARACTER RECOGNITION SYSTEM

Filed May 31, 1962 10 Sheets-Sheet 10

Inventor:
Morton Nadler
By Baldwin & Wight
Attorneys

United States Patent Office 3,202,965
Patented Aug. 24, 1965

3,202,965
CHARACTER RECOGNITION SYSTEM

Morton Nadler, Fresnes, France, assignor to Compagnie des Machines Bull (Societe Anonyme), Paris, France
Filed May 31, 1962, Ser. No. 198,843
Claims priority, application France, June 21, 1961, 865,595
10 Claims. (Cl. 340—146.3)

This invention relates to systems for recognising graphic data and more particularly to those which are provided with means for determining the orientation of portions of written characters for the purpose of recognising said characters.

In practice, the graphic data which are to be identified appear on a support, portions of this support having a broadly predetermined shade, for example a dark shade, which will hereinafter be called the shade of the character, while the other portions of the support then form what will hereinafter be called the background and have another broadly predetermined shade, for example a light shade, which will hereinafter be called the background shade. The difference in sensation produced on the human eye by these two shades produces an impression of contrasts in the observer's mind, and the visual recognition of the characters can be effected only when a certain contrast exists between the shade of the character and the background shade.

It is to be noted that in practice the shade of the character varies in one and the same character, as also does the shade of the background against which the said character is set, so that the various portions of one character do not appear with the same contrast in relation to the surrounding background, but that it is sufficient, in order that the reading may be possible, for a contrast to exist between each character portion and the adjacent portion of the background, reading being possible even when the contrast is reversed in the case of certain portions of characters.

Under otherwise equal conditions, the contrast impression is attenuated when the edges of the characters are blurred, that is to say, when there exists between the portions of characters and the surrounding portions of the background intermediate support portions having a shade intermediate between the shade of the character and the background shade.

Endeavours have been made to provide character recognition systems which are capable of detecting the contrast perceptible to the human eye.

In known character recognition systems, the detection of the portions of the support which are covered by the characters is effected in the following way. Each reading signal corresponding to the examination of an elemental area of the support is compared with a limiting level which is either arbitrarily determined or determined as a function of the signals corresponding to the examination of adjacent elemental areas. The reading signals which exceed this limiting level are considered as necessarily corresponding to the graphic data and only they are used. The signals which do not exceed the limiting level are not used by the recognition circuits and the useful information contained in these signals when the limiting level is too high is thus lost.

In contradistinction to the known character recognition methods involving the conversion of the scanning signals into numerical signals, the method according to the invention comprises the application, without conversion, of the scanning signals to integrating circuits and the utilisation, without conversion, of the results of the various summations effected by these integrating circuits.

The invention has for its object to provide:

An improved system for the recognition of graphic data which avoids the aforesaid disadvantages, A system for the recognition of graphic data which is capable of better utilising the signals obtained in the scanning of a writing support than the known systems of the same type, A device for processing the signals obtained in the scanning of an elemental zone of a writing support, the said device being capable of determining the orientation, and where necessary, the shape of the edge of the portion of graphic data which is comprised within the said elemental zone, A device for processing signals obtained during the scanning of two elemental areas of like dimension of a writing support, or of two groups of elemental areas of like dimension of the said support, the said device being capable of determining the contrast existing between these two elemental areas, or between these two groups of elemental areas, by a measurement of the difference of the scanning signals of these two elemental areas, or of these two groups of elemental areas, An improved device for the combined control of the scanning device and of the devices for processing the scanning signals in a system for the recognition of graphic data.

A character recognition system according to the invention may comprise:

A scanning device capable of generating a scanning signal which is a function of the mean shade of an elemental area of predetermined shape and dimensions of the writing support, the position on this support of the elemental area thus scanned being dependent upon the action of control devices of the system, An elemental analysing device utilising the scanning signals generated by the scanning device in the course of an elemental analysing cycle called the minor cycle, for supplying, where necessary, signals indicating the orientation of the edge of the character portion scanned in the course of the said minor cycle, which elemental analysing device comprises a set of integrating circuits each capable of effecting the integration of the signals applied thereto, and distributing circuits each associated with a different integrating circuit of the said set of integrating circuits and each capable of applying scanning signals in their true value or after reversal of their sign, and of not transmitting certain scanning signals, to their associated integrating circuit, An elemental analysing control device capable of simultaneously controlling a scanning device and the elemental analysing device in cycles called minor cycles, so that the scanning device scans at each of the said minor cycles a series of elemental areas forming a predetermined elemental figure having a centre of symmetry whose position on the printing support may be verified, and in such manner that each of the distributing circuits of the analysing device applies in their true value to the integrating circuit which is associated therewith the scanning signals of a group of elemental areas of the said series and, after reversal of sign, the scanning signals of the elemental areas symmetrical in relation to the said centre of symmetry with those of the said group, the various integrating circuits effecting in the course of a minor cycle the summation of scanning signals of predetermined different groups of elemental areas and being returned to the same initial state at the beginning of each minor cycle, A device for recognising shape elements capable of combining the sums obtained by the various integrating circuits in the course of a number of minor cycles of a common major cycle for generating signals indicatting the presence of strokes, their position and their orientation on the elemental areas scanned in the course of a major cycle, A character recognition device capable of combining the signals generated by the device for the recognition of shape elements in the course of a major cycle, comprising a predetermined number of minor cycles, for generating a signal representing the character scanned in the course of the said major cycle, and A character recognition control device capable of controlling the scanning device, the device for the recognition of shape elements and the character recognition device in such manner that the centres of symmetry of the elemental figures formed by the successive series of elemental areas scanned in the course of a major cycle form on the writing support a predetermined distribution covering the position of a single character, and in such manner that the signals supplied by the elemental analysing device are utilised by the device for the recognition of shape elements and by the character recognition device for the purpose of recognizing shape elements of the character scanned in the course of the said major cycle and recognising the said character, respectively.

For a better understanding of the invention and to show how it may be carried into effect, an embodiment thereof will now be described, by way of example with reference to the accompanying drawings, in which.

Figure 7A:
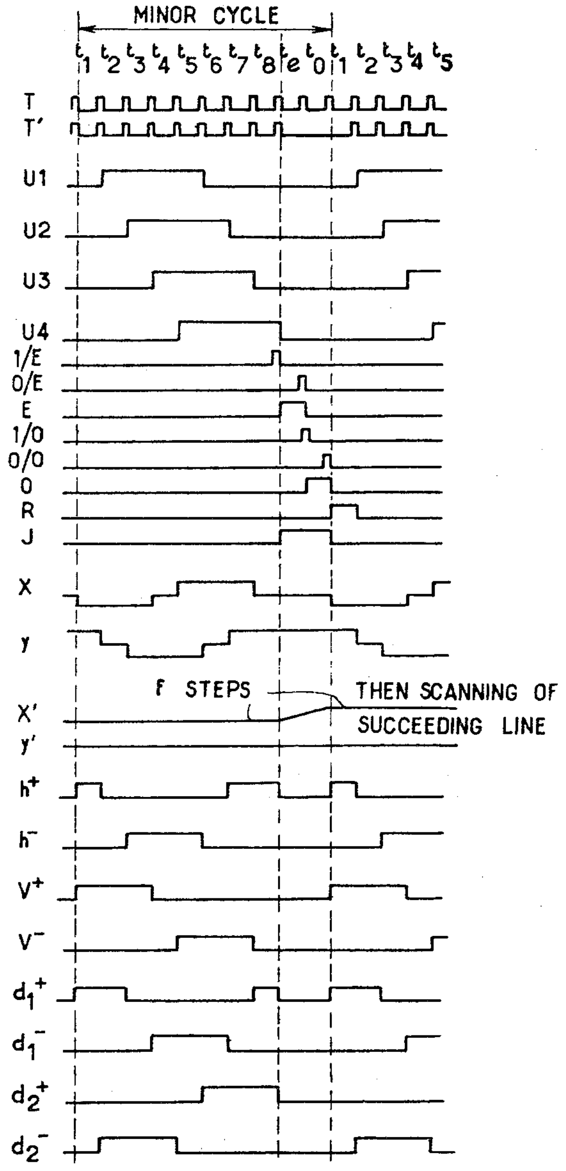
Figure 7B:
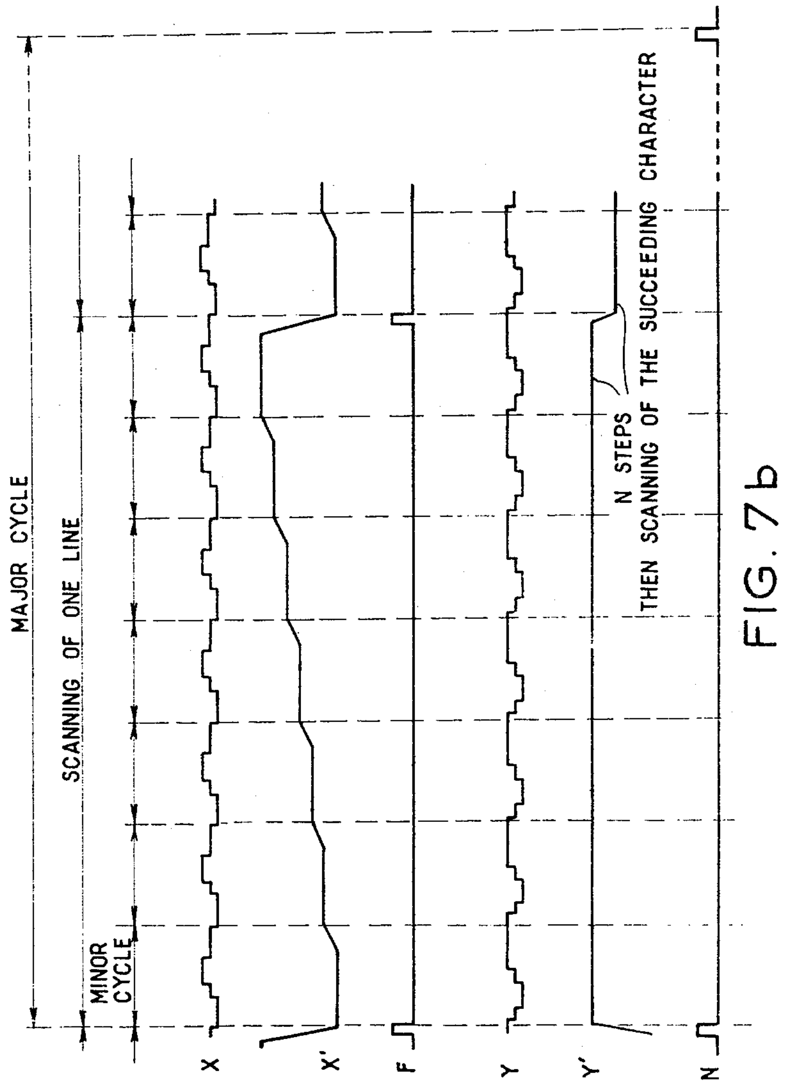
Figure 8A:
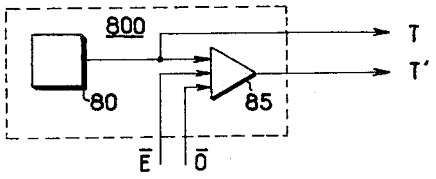
Figure 8B:
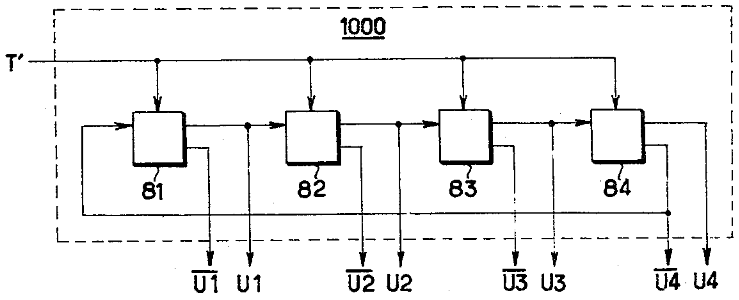
Figure 9A:
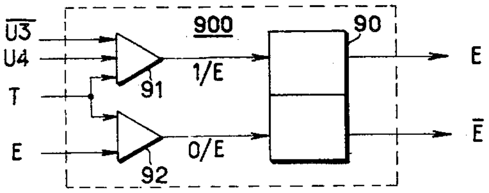
Figure 9B:
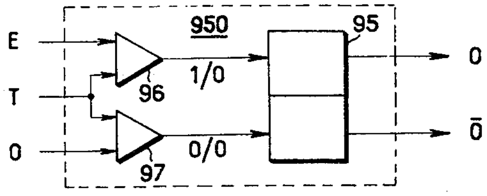
Figure 10A:
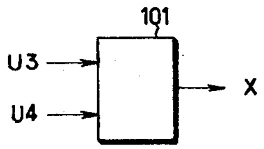
Figure 10B:
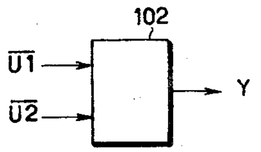
Figure 11:
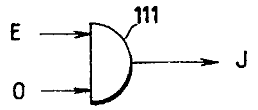
Figure 12:
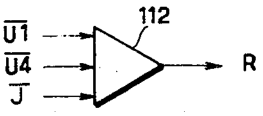
Figure 13:
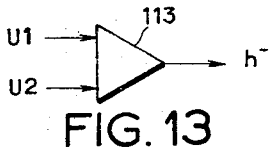
Figure 14:
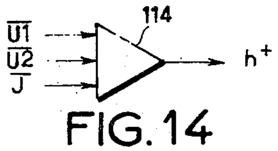
Figure 15:
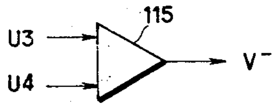
Figure 16:
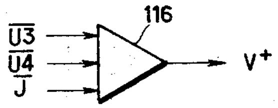
Figure 17:
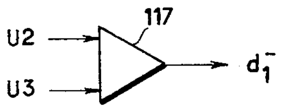
Figure 18:
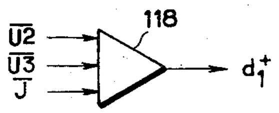
Figure 19:
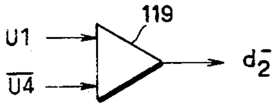
Figure 20:
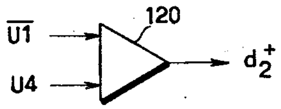
Figure 21:
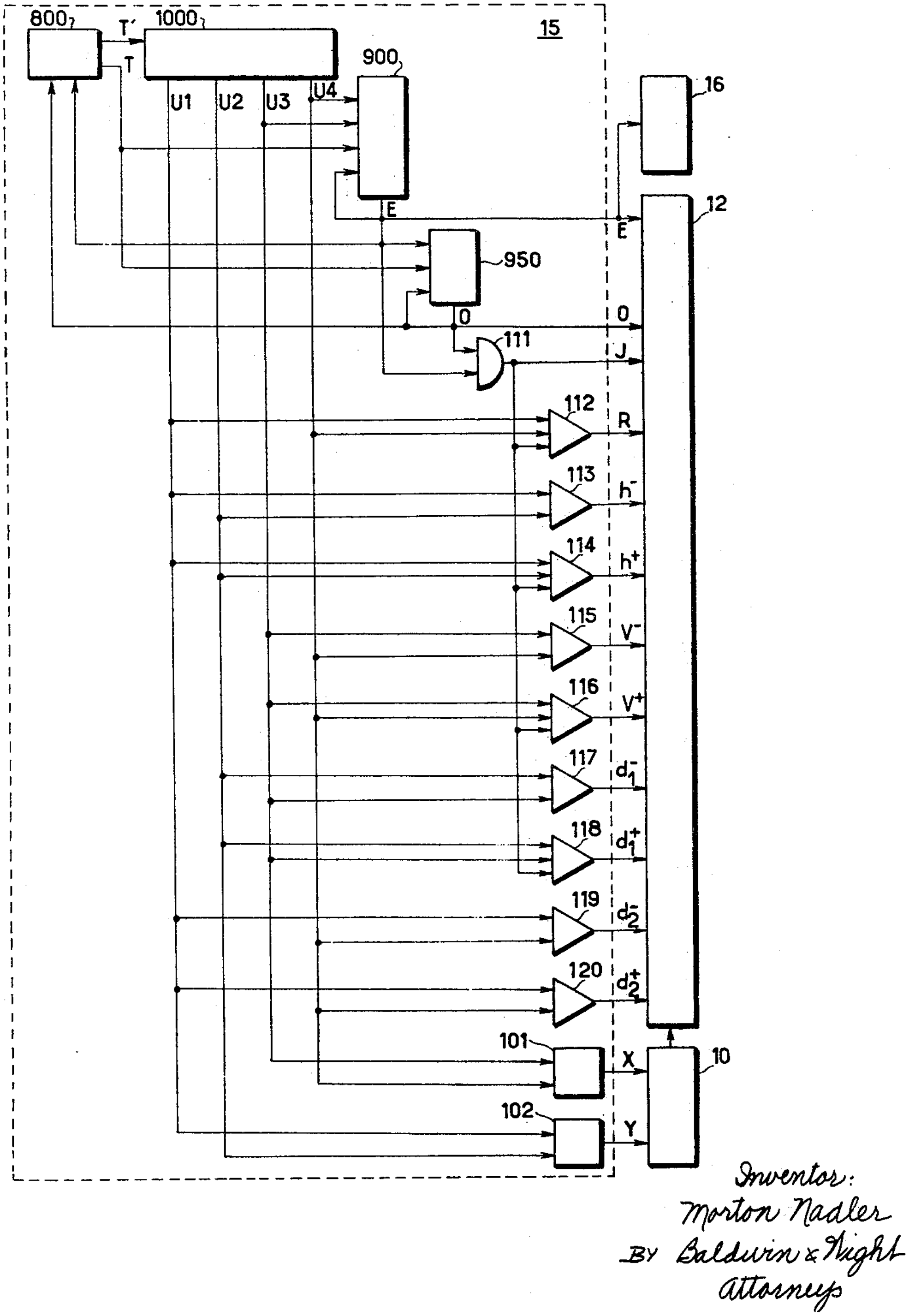
Figure 22:
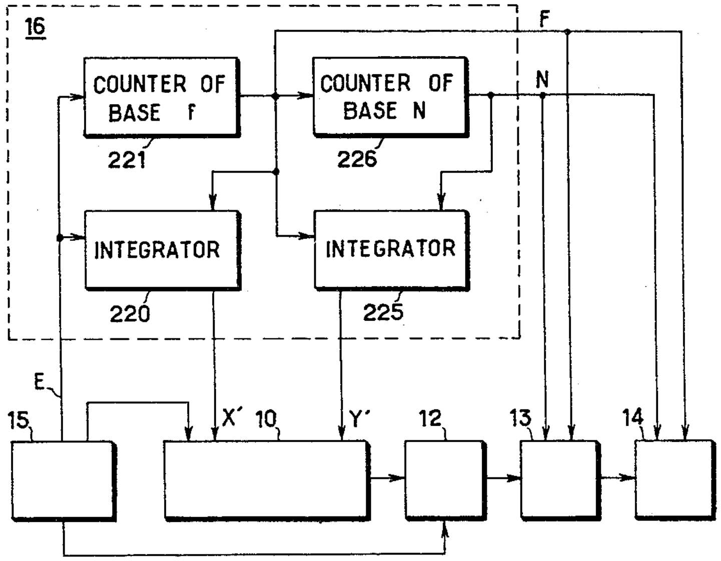
Figure 23:
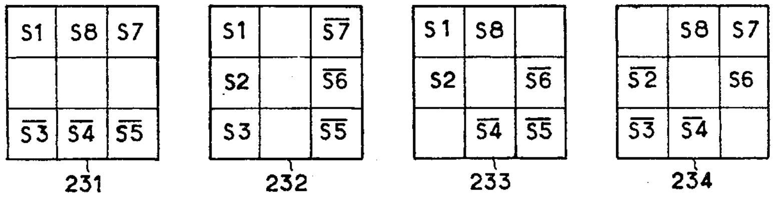
Figure 24:
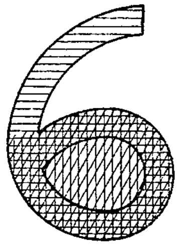

FIGURES 7*a* and 7*b* are curves representing the control voltages of the system, FIGURES 8*a*, 8*b*, 9*a*, 9*b*, 10*a*, 10*b* and 11 to 20 illustrate portions of the elemental analysing control device, FIGURE 21 is the general circuit diagram of the elemental analysing control device, FIGURE 22 illustrates the character recognition control device, FIGURE 23 is an explanatory diagram of the manner in which the scanning signals are exploited, and FIGURE 24 illustrates a character of non-uniform shade printed on a support whose background shade is not uniform.

Figure 1:
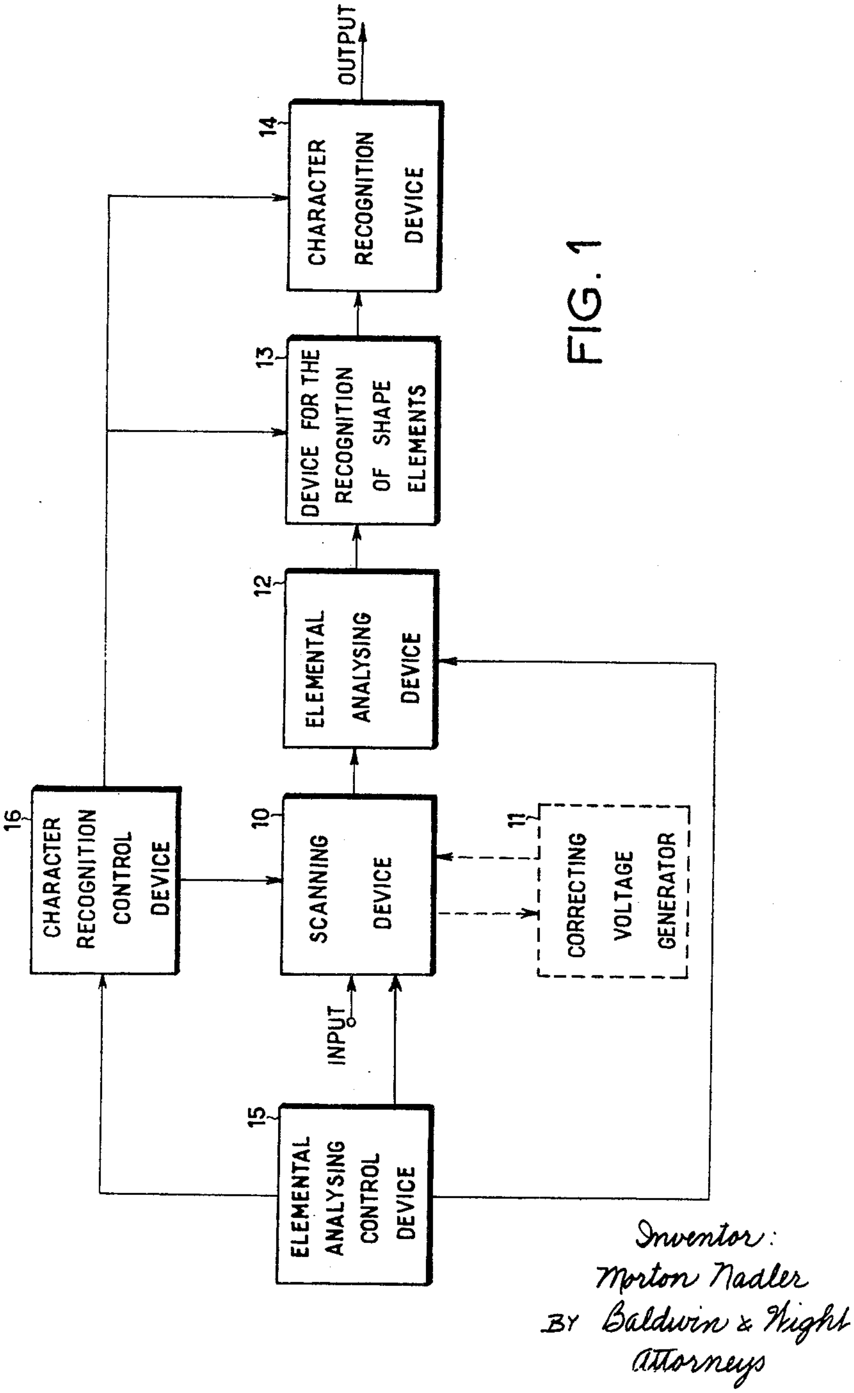
FIGURE 1 is an overall diagram of the system.

There is shown in FIGURE 1 the overall diagram of the system, which comprises a scanning device 10, if necessary a correcting voltage generator 11, an elemental analysing device 12, a device 13 for the recognition of shape elements of the characters scanned, a character recognition device 14, an elemental analysing control device 15 and a character recognition control device 16.

The scanning device 10, which is provided with appropriate control members, is capable of generating a scanning signal which is a function of the mean shade of an elemental area, of predetermined shape and dimensions of the writing support, the position on said support of the elemental area thus scanned being determined by the said control members.

The correcting voltage generator 11 makes it possible to correct the voltages acting on the control members of the scanning device, so as to determine the position on the writing support of the elemental areas scanned, taking into account the errors in the position of the written characters and of the relative displacements of the writing support and of the scanning device.

The elemental analysing device 12 utilises the scanning signals supplied by the scanning device 10 in the course of an elemental scanning cycle, or minor cycle to supply, where necessary, signals indicating the orientation of the edge of the portion of character scanned in the course of the said minor cycle.

The device 13 for the recognition of shape elements of the characters scanned utilises signals supplied by the device 12 in the course of a number of minor cycles for supplying a signal representing a shape element of the character scanned in the course of the said minor cycles.

The character recognition device 14 utilises one or more signals supplied by the device 13 in the course of a major cycle comprising a predetermined number of minor cycles for generating a signal representing the character scanned in the course of the said major cycle.

The elemental analysing control device 15 comprises circuits generating the various voltages (T, T′, U1, U2, U3, U4, $x$, $y$, $h^+$, $h^-$, $v^+$, $v^-$, $d_1^+$, $d_1^-$, $d_2^+$, $d_2^-$, E, O, R, J) represented in FIGURE 7*a*. These voltages control the operation of the scanning device 10 and the operation of the elemental analysing device 12 and the character recognition control device 16.

The scanning device 10 thus controlled scans in the course of each minor cycle a series of elemental areas of the writing support forming an elemental figure having a centre of symmetry whose position is determined at each minor cycle and the elemental analysing device 12 thus controlled utilises the scanning signals generated in the course of a minor cycle to supply, where necessary, signals representing the orientation of the edge of the portion of the character scanned in the course of the said minor cycle.

The character recognition control device 16 comprises circuits generating the voltages ($x'$, $y'$, F, N). These voltages control the operation of the scanning device 10 and the operation of the recognition devices 13 and 14, so that the centres of symmetry of the successive series of elemental areas scanned in the course of a major cycle form on the writing support a predetermined distribution covering the position of a single character, and in such manner that the signals supplied by the elemental analysing device 12 are utilised by the devices 13 and 14 for the purpose of recognising shape elements of the character scanned and of recognising the said character, respectively.

In the following description, it will be assumed that the writing support is so disposed in relation to the scanning device of the character recognition system that a rectangular space, in which a character is written, can be completely scanned by the scanning device in the course of a major cycle. The correcting voltage generator 11 is then unnecessary.

Figure 2:
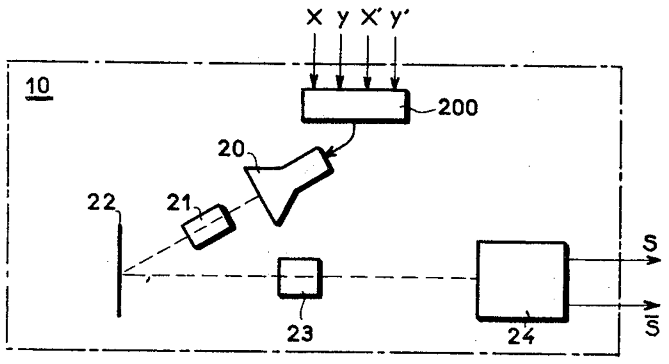
FIGURE 2 illustrates the scanning device.

The scanning device 10 (FIGURE 1 and FIGURE 2) of the system now being described is of the moving-spot type and comprises a cathode-ray tube 20 (FIGURE 2), with which there is combined a deflecting circuit 200 forming the voltages necessary for controlling the position of the said spot on its screen. An optical system 21 forms a reduced image of the spot on the writing support 22 and an optical system 23 projects onto a photoelectric device 24 any light reflected by the support 22. The photoelectric device 24 supplies direct and complementary scanning signals S and $\overline{S}$, which are a function of the intensity of the light thus projected. The voltages supplied by the deflecting circuit 200 are such that, in order completely to scan a rectangular space 30 (FIGURE 3) of the writing support, in the course of a major cycle, the image of the spot is successively formed on elemental areas regularly situated around a square A0, and then on elemental areas regularly situated around the squares B0, C0, . . . F0, the centres *a*0, *b*0, etc., of the squares A0, B0, etc. being regularly spaced along parallel lines 31, 32 . . . 3*n*, which are in turn regularly spaced within the rectangular space 30 of the writing support.

Figure 4:
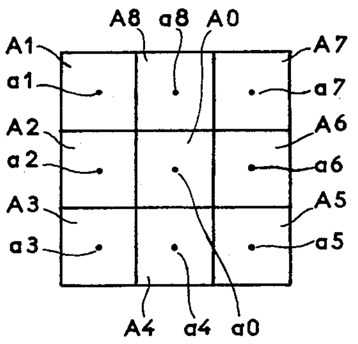

FIGURE 4 shows more precisely how the image of the spot is successively formed around a square such as A0. The image of the spot is first formed on a square elemental area A1 centred at *a*1, and then on an elemental square area A2 centred at *a*2, etc., and finally on an elemental area A8 centred at *a*8.

Figure 5:
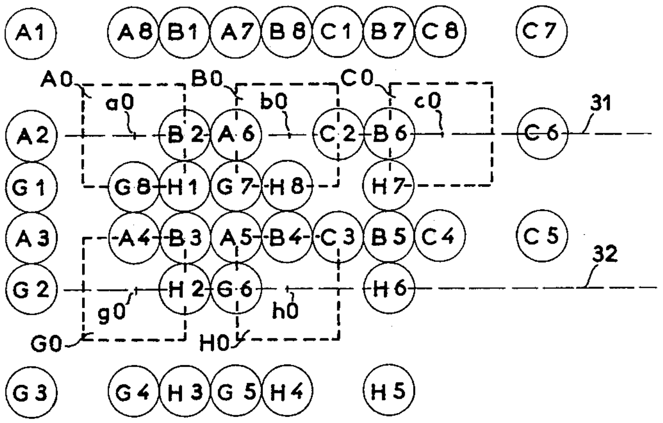

FIGURE 5 shows how the image of the spot is successively formed on elemental areas A1, A2, . . . A8, B1, B2, . . . B8, C1, C2, . . . C8, etc., forming groups of areas surrounding the squares A0, B0, C0, etc., respectively, whose respective centres $a0$, $b0$, $c0$, etc., are regularly spaced along a horizontal line 31, and then on elemental areas G1, G2, . . . G8, H1, H2, . . . H8, etc. forming groups of areas surrounding the squares G0, H0, etc., respectively, whose respective centres $g0$, $h0$, etc., are regularly spaced along a horizontal line 32 written in the rectangular space 30 of the writing support. The elemental areas have been represented by circles in FIGURE 5. It will be seen that the areas thus scanned completely cover the rectangular space 30 (FIGURE 3) of the writing support. The method of scanning just described thus makes it possible to scan completely a character such as the character "2" written in the said space 30.

The scanning signals S and $\overline{S}$ supplied by the photoelectric device 24 (FIGURE 2) are transmitted to the elemental analysing device 12 (FIGURE 6), which comprises four distributing circuits 61, 62, 63 and 64 (FIGURE 6) controlled by the pairs of signals $h^+$, $h^-$; $v^+$, $v^-$; $d_1^+$, $d_1^-$, $d_2^+$, $d_2^-$, respectively (FIGURE 7$a$).

The distributing circuit 61 consists of two "AND" circuits 611 and 612, which receive respectively the direct and complementary scanning signals S and $\overline{S}$, which are controlled by the signals $h^+$, $h^-$ respectively, and which supply their respective output signals to an integrating circuit 66 through the conductors 6111, 6112 respectively.

Figure 6:
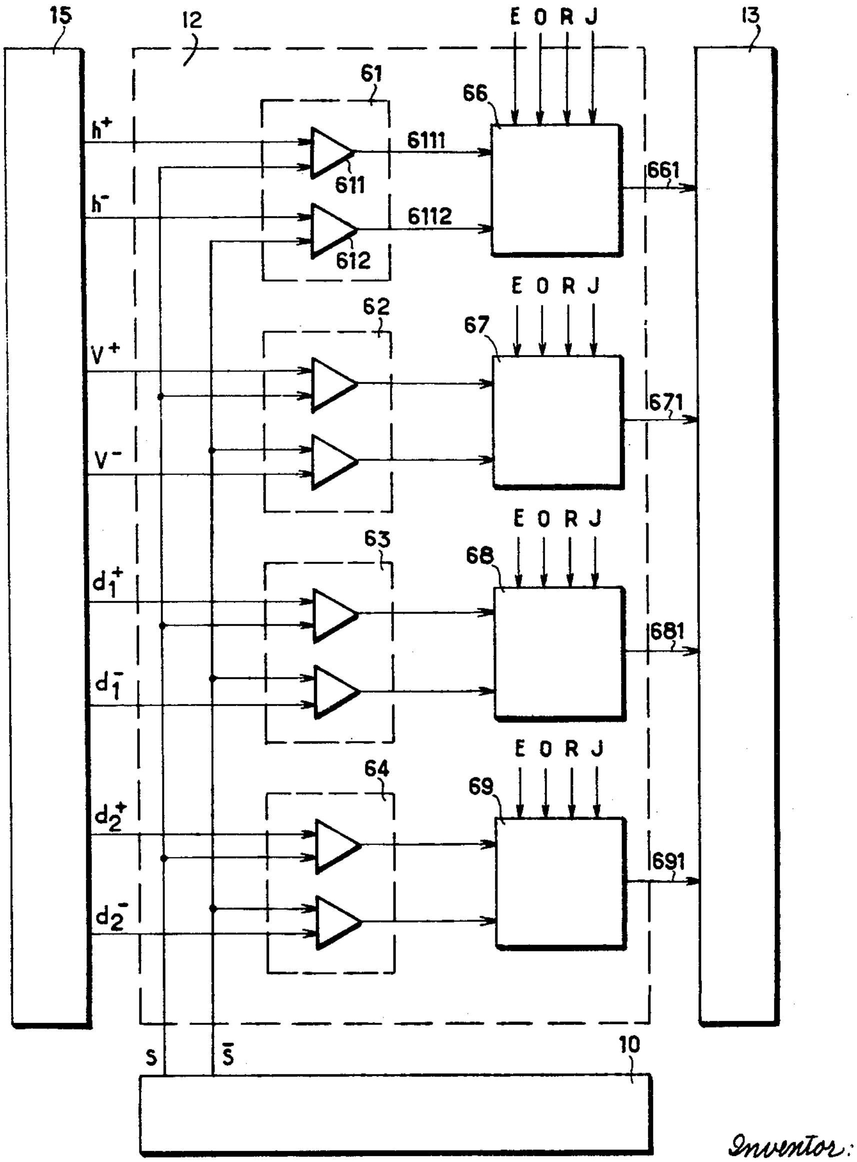
FIGURE 6 illustrates the elemental analysing device.

The other distributing circuits 62, 63 and 64 are of exactly the same form, their "AND" circuits being controlled by the signals $v^+$, $v^-$, $d_1^+$, $d_1^-$, $d_2^+$, $d_2^-$, as shown in FIGURE 6, while their output signals are applied to the integrating circuits 67, 68 and 69 respectively.

The scanning signals supplied by the photoelectric device 24 (FIGURE 2) are thus applied in parallel to the four distributing circuits 61, 62, 63, 64 (FIGURE 6), which have the function of transmitting as direct or complementary values, or of not transmitting, to the integrating circuits 66, 67, 68, 69 respectively, the scanning signals which are applied thereto, in accordance with the value of the signals $h^+$, $h^-$, $v^+$, etc., by which they are controlled.

The output signals of the integrating circuits 66, 67, 68, 69 are transmitted through the conductors 661, 671, 681, 691 to the device 13 for the recognition of shape elements of the scanned characters. At the end of each minor cycle, the integrating circuits are returned to their initial state under the control of the voltages E, O, R, J (FIGURE 7$a$) generated by the elemental analysing control device.

There are plotted in FIGURES 7$a$ and 7$b$, as a function of time, the curves of the voltages which must be generated in order to obtain the scanning mode and the exploiting mode just described.

The time intervals are represented in these figures by the indications given above the said curves. The indications such as $t1$, $t2$, . . . $t8$, for example, denote the instants from which the elemental areas A1, A2, . . . A8 respectively (or B1, . . . B8, or C1, . . . C8, etc., depending upon the minor cycle under consideration) are scanned.

The curves $x$ and $y$ indicate the variations as a function of time of the voltages applied to the deflecting members of the cathode-ray tube 20 (FIGURE 2) for producing, respectively, horizontal and vertical deflections of the cathode beam, such that the image of the spot is successively formed in the course of a minor cycle on elemental areas situated around a square as shown in FIGURE 4.

Figure 3:
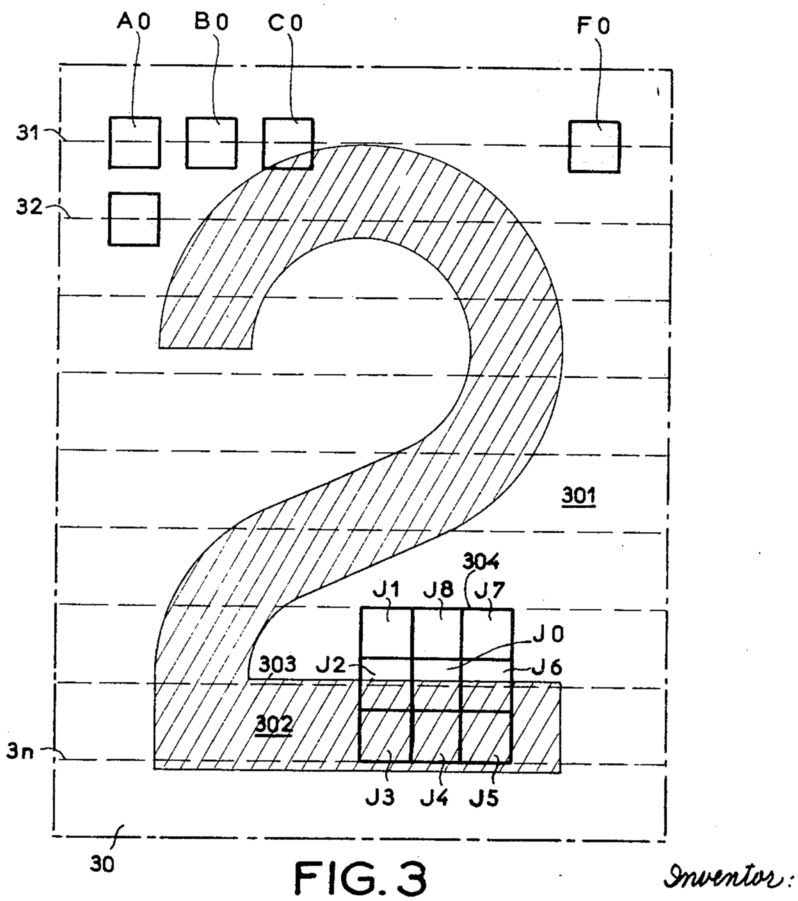
FIGURES 3, 4 and 5 illustrate the method of scanning the character.

The voltages $x'$ and $y'$ which will hereinafter be referred to and which have also been indicated in FIGURE 7$a$, are superimposed on the voltages $x$ and $y$ respectively in such manner that the image of the spot is successively formed, in the course of a major cycle, around squares situated in a rectangular space as shown in FIGURE 3.

The voltages $x$ and $y$ are conveniently obtained, as will be seen, from control signals supplied by the analysing control device 15 (FIGURE 1). The chronometric portion 800 (FIGURE 8$a$) of this device comprises a clock 80 which supplies clock pulses T (FIGURE 7$a$) and an "AND" circuit 85 which is controlled by signals $\overline{E}$, $\overline{O}$ (FIGURE 7$a$) so as to set up at its output only certain pulses T' (FIGURE 7$a$) taken from the clock pulses T.

In the following, it will be assumed that any circuit element capable of supplying a signal Z is also capable of supplying a signal $\overline{Z}$ complementary to Z.

That portion of the analysing control device which is illustrated in FIGURE 8$b$ is a control signal generator 1000 consisting of a shift register having four stages (81, 82, 83, 84). The direct-signal output of each stage is connected to the input of the succeeding stage and the complementary-signal output of the last stage 84 is connected to the input of the first stage 81. The transfers between stages of the shift register are controlled by the pulses T'.

The curves of the voltages U1, U2, U3, U4 which are then set up at the direct-signal outputs of the stages 81, 82, 83, 84 are plotted in FIGURE 7$a$.

The circuits of the analysing control device which are illustrated in FIGURES 9$a$ and 9$b$, i.e. 900 and 950, are circuits generating pulses determining the end of minor cycles. These circuits have the function of supplying at their outputs the voltages E and O, whose curves are shown in FIGURE 7$a$. These voltages, as also the complementary voltages $\overline{E}$, $\overline{O}$, are utilised to control certain circuits of the analysing control device, as will hereinafter be seen and has already been seen with reference to the production of the pulse trains T'. The voltage pulses E and O set up at the instants $t$E and $t$O respectively define two separate consecutive time intervals at the end of each minor cycle. In the course of these time intervals, each of which is equal to the interval between two consecutive clock pulses, the scanning operation is suspended, while certain intermediate operations are performed, more especially the exploitation of the information collected in the course of the minor cycle which is ending and the preparation of certain circuits for the purpose of performing the succeeding minor cycle.

The circuits illustrated in FIGURES 9$a$ and 9$b$ have identical structures and each comprise a bistable trigger (i.e. 90 and 95), whose changes of state are controlled by the output signals ($1/E$ and $0/E$ on the one hand, and $1/O$ and $0/O$ on the other hand—see FIGURE 7$a$) of two "AND" circuits (91 and 92 on the one hand, and 96 and 97 on the other hand), whose logical functions are represented by the equations:

$1/E=\overline{U}3.U^4.T$ and $0/E$=T.E. on the one hand
$1/O$=T.E. and $0/O$=T.O on the other hand The following table indicates the logical and analogue equations which state the relationships between the various signals, supplied by the control signal generator 1000 and by the triggers 90 and 95, and the corresponding logical and analogue functions which are to be performed by the analysing control device.

$$x=U3(+)U4$$
$$J=E+O$$
$$h^-=U1.U2$$
$$v^-=U3.U4$$
$$d_1^-=U2.U3$$
$$d_2^-=U1.\overline{U4}$$
$$y=\overline{U1}(+)\overline{U2}$$
$$R=\overline{U1}.\overline{U4}.\overline{E}.\overline{O}=\overline{U1}.\overline{U4}.J$$
$$h^+=\overline{U1}.\overline{U2}.\overline{E}.\overline{O}.=\overline{U1}.\overline{U2}.J$$
$$v^+=\overline{U3}.\overline{U4}.\overline{E}.\overline{O}.=\overline{U3}.\overline{U4}.J$$
$$d_1^+=\overline{U2}.\overline{U3}.\overline{E}.\overline{O}=\overline{U2}.\overline{U3}.J$$
$$d_2^+=\overline{U1}.U4$$

In the first two equations of the table, the notation (+) indicates an analogue sum. Analogue adders (i.e. 101, FIGURE 10*a* and 102, FIGURE 10*b*) are therefore necessary for obtaining $x$ and $y$ respectively from the signals $U3=1$ and $U4=1$ on the one hand and from the signals $\overline{U1}=1$ and $\overline{U2}=1$ on the other hand.

The other equations of the table are logical equations. The circuits performing the operations indicated by these logical equations are diagrammatically represented in FIGURES 11 to 20. In these figures, the element 111 is an "OR" circuit, and the elements 112, 113, . . . 120 are "AND" circuits.

The general circuit diagram of the elemental analysing control device 15 is shown in FIGURE 21. It arises out of the partial diagrams shown in FIGURES 8 to 20, it being understood that direct signals and complementary signals are simultaneously available at each output of the circuit elements illustrated. The character recognition control device 16 (FIGURE 1 and FIGURE 22) comprises circuits generating stepped voltages $x'$ and $y'$, which are shown in FIGURES 7*a* and 7*b*. These voltages $x'$ and $y'$ are applied to the deflecting circuits 200 (FIGURE 2) of the cathode-ray tube 20 in order to be superimposed on the voltages $x$ and $y$ respectively, and thus to determine the scanning of elemental areas situated as shown in FIGURES 3, 4 and 5.

If $f$ is the number of square elemental figures which have to be scanned on each line 31, 32, . . . 3*n*, comprised in the space 30 (FIGURE 3) of the writing support and if $n$ is the number of lines 31, 32, . . . 3*n*, along which are distributed the centres of symmetry of the square elemental figures scanned in the course of the scanning of the space 30, the voltage $x'$ must comprise $f$ steps and a voltage $y'$ must comprise $n$ steps.

FIGURE 22 illustrates a scanning control device 16 capable of generating the voltages $x'$ and $y'$. This device comprises an integrating circuit 220, to the input of which are applied the pulses E and which is returned to zero by the output pulse F (FIGURE 7*b*) of a counter 221 having a base $f$, to the input of which the pulses E are also applied. This integrating circuit 220 supplies the voltage $x'$ (FIGURE 7*b*).

The device 16 comprises in addition an integrating circuit 225, to the input of which are applied the pulses F supplied by the counter 221 having a base $f$, and which is returned to zero by the output pulse N (FIGURE 7*b*) of a counter 226 having a base $n$, to the input of which are also applied to the pulses F. This integrating circuit 225 supplies the voltage $y'$ (FIGURE 7*b*).

The output pulses N and F of the counters 221 and 226 are both applied to the shape element recognition devices 13 and to the character recognition devices 14.

The devices 10 and 12 controlled as hereinbefore indicated by the device 15 permit of determining, as will be seen, the orientation of the common limit of two regions in which the writing support has different shades.

In FIGURE 3, the region 301 has the background shade and the region 302 the shade of the character. The line 303 marks the limit separating the regions 301 and 302. If, in the course of a minor scanning cycle, the elemental square figure 304 is scanned, that is to say, if the elemental areas J1, J2, . . . J8 situated around the square J0 are successively scanned, the device 10 successively supplies the signals S1, S2, . . . S8 to the direct-signal output, and the signals $\overline{S1}$, $\overline{S2}$, . . . $\overline{S8}$ to the complementary-signal output. By reason of the application of the control signals $h^+$, $h^-$ (FIGURE 7*a*) and the "AND" circuits of the distributing circuit 61 (FIGURE 6), the signal S1 is transmitted to the integrating circuit 66, while the signal $\overline{S1}$ is not, the signals S2 and $\overline{S2}$ are not transmitted, and the signals $\overline{S3}$, $\overline{S4}$, $\overline{S5}$ are transmitted, while the signals S3, S4, S5 are not, the signals S6 and $\overline{S6}$ are not transmitted and finally the signals S7 and S8 are transmitted, while the signals $\overline{S7}$ and $\overline{S8}$ are not.

In the square 231 of FIGURE 23 there are indicated, in the relative positions of the corresponding scanned elemental areas, the scanning signals which are transmitted, as has just been seen, by the distributing circuit 61 to the integrating circuit 66. There have likewise been indicated in the squares 232, 233 and 234 the scanning signals which are transmitted by the distributing circuits 62, 63, 64 to the integrating circuits 67, 68, 69 respectively.

Assuming that the scanning signals of the elemental areas belonging to a common region are substantially equal to one another, and are substantially different from the scanning signals of the elemental areas belonging to the other region, it will readily be seen that in the present case the result of the summation effected by the integrating circuit 66 is higher in absolute value than the result of the summation effected by any other of the integrating circuits 67, 68 and 69. The integrating circuit 66 serves to subtract from the three signals S1, S8 and S7, all of which correspond to elemental areas of the region 301, the three signals S3, S4 and S5 which all correspond to elemental areas of the region 302. The algebraic sum formed may be written $$(S1-S3)+(S8-S4)+(S7-S5)$$

The result of the operation performed is therefore substantially equal to three times the difference between scaning signals of different regions. On the other hand, the result of the summation effected by each of the integrating circuits 68 and 69 is substantially lower than three times the difference between scanning signals of different regions, since the circuits 68 and 69 form respectively the algebraic sums $$(S1-S5)+(S8-S4)+(S2-S6)$$

and $(S7-S3)+(S8-S4)+(S6-S2)$, in which the terms $(S2-S6)$ and $(S6-S2)$ may be neglected because the signals S2 and S6 correspond to elemental areas on which the background shade and the shade of the character are simultaneously present and may produce substantially equal scanning signals S2 and S6. Finally, the result of the operation performed by the integrating circuit 67 is substantially zero, because this integrating circuit subtracts from each of the signals S1, S2 and S3 a signal (i.e. S7, S6 and S5 respectively) belonging to the same region.

At the end of the minor cycle in the course of which the square elemental figure 304 has been scanned, the resultant signals supplied by the integrating circuit 66 is therefore higher than each of the resultant signals supplied by the integrating circuits 67, 68 and 69. This shows that the limit between the regions 301 and 302, within the square elemental figure 304 (FIGURE 3), is horizontal and extends in the neighborhood of the centre of symmetry of this elemental figure. The shape element recognition device 13 (FIGURES 1 and 6) is designed to interpret the results in combination with the results obtained of the scanning of adjacent elemental figures.

The signals produced by the shape element recognition device 13 are applied to the character recognition device 14, which is capable of recognizing the character analysed from the nature, the number and the arrangement of the shape elements identified by the device 13. The device 14 is arranged to supply an output signal representing, in accordance with a code, the recognized character.

It will be seen that a system according to the invention performs the analysis of a given space of the support by comparing together at each minor cycle the shades of certain elemental areas of a series of elemental areas forming an elemental figure of predetermined shape in this space of the writing support. When a portion of a character occupies certain elemental areas of the said series, it is possible by means of the signals resulting from the comparison performed in the course of a minor cycle to determine the direction of the boundary separating the character from the background in the elemental figure scanned in the course of this minor cycle, and this result depends only upon the contrast existing between the shade of the character and the background shade on the elemental areas belonging to the said series.

A system according to the invention thus makes it possible to recognize characters of non-uniform shade which are written upon a background of non-uniform shade as illustrated in FIGURE 24, in which it will be seen that the upper part of the character "6" is less dark than that portion of the background which is situated within the lower portion of the said character.

The operation of the system is not modified if the regions having the background shade and the shade of the character are separated from one another by a region of intermediate shade, provided that the width of the latter region is smaller than the largest dimension of the elemental areas. It is thus possible with the system according to the invention to recognise characters written by means of carbon papers and ribbons.

If, as is shown in FIGURE 3, the largest dimension of the elemental figure formed by the elemental areas scanned in the course of a minor cycle is of the same order of magnitude as the thickness of the strokes forming the characters to be scanned, it is highly probable that the signals supplied by the elemental analysing device in the course of a minor cycle comprising the scanning of a portion of a character, will be utilisable by the shape element recognition device for the purpose of recognising the said character.

In order to obtain sufficient uniformity of the lighting of each elemental area scanned, the moving scanning spot may be caused to describe Lissajous curves inscribed in squares projected on to these elemental areas.

The foregoing description relates only to one particular embodiment of the invention. Thus, the series of elemental areas scanned in the course of the various minor cycles may comprise any number of elemental areas situated on the writing support so as to form any appropriate elemental figure having a centre of symmetry. The centres of symmetry of the elemental figures formed by the various series of elemental areas scanned in the course of the various minor cycles may be distributed in any appropriate ways on the writing support. They need not be distributed either uniformly or in a predetermined way. Their position may be determined, for example, as a function of the results of the operations performed by the system. The number of minor cycles comprised in each major cycle may be determined by the character recognition device in such manner that a major character recognition cycle can be completed before the end of the complete scanning of these characters, as soon as a sufficient number of shape elements have been recognised. The scanning signals of the various elemental areas of each series may be obtained in a way different from that hereinbefore described. More particularly, the elemental areas of each series may be scanned in parallel by means of a corresponding number of photoelectric cells on to which are successively projected the various portions of the location of the support containing a character to be recognised.

I claim:

1. A device for determining the distribution of shades on a graphical data bearing medium, in a zone thereof having a perimeter with a centre of symmetry, said device comprising a plurality of means, each for evaluating the difference between the average shades of two portions of said zone which are symmetrical about said centre of symmetry, the portions for which such difference is evaluated by one of said means being different from the portions for which such difference is evaluated by any other one of said means.

2. A device for determining the distribution of shades on a graphical data bearing medium, in a zone thereof having a perimeter with a centre of symmetry, said device comprising means for scanning identical elementary cells which are regularly spaced in said zone along said perimeter, to provide scan signals each characteristic of the average shade of a different scanned cell, and a plurality of means, each for combining said scan signals to derive a combination signal representative of the difference between the average shades of two portions of said zone which are symmetrical about said centre of symmetry, each of said portions being formed of a predetermined number of scanned cells, the portions for which a combination signal is derived by one of said combining means being different from the portions for which a combination signal is derived by any other one of said combining means.

3. In a character recognition system having means for recognizing elementary oriented strokes in a character to be recognized, the combination comprising means for scanning identical elementary areas of a field which includes a character to be recognized to derive voltages directly varying with the mean shades of the scanned elementary areas, means for integrating the scan derived voltages either positively or negatively, and logical digital means for controlling said scanning means and said integrating means, to cause the scanning means to scan each character position according to a predetermined compound scanning pattern containing a micro-pattern superimposed on a principal scanning pattern, and to cause the integrating means to perform a separate integration for each micro-pattern scan, the voltages derived from the scanning of a first group of elementary areas of the micro-pattern being integrated positively and the voltages derived from the scanning of a second group of elementary areas of the micro-pattern being integrated negatively during each integration.

4. In a character recognition system, means for scanning elementary areas of a field which includes a character to be recognized to deliver opposite voltages varying with the mean shade of the scanned elementary area, respectively, with the same sense and with the opposite sense of variation, said scanning means being adapted cyclically to scan a series of elementary areas of the same shape and dimensions regularly spaced along a closed equilateral polygonal line having a centre of symmetry which, in successive cycles, successively moves to each of a plurality of spots of said field, and means for analysing the voltages obtained from the scanning means, said analysing means comprising a plurality of voltage integrators each arranged to integrate positive as well as negative voltages, and a plurality of switch means each associated with a different one of said integrators and arranged to transmit one or the other of said opposite voltages to the associated integrator according to whether the scanning means is scanning the elementary areas of a predetermined group of consecutive elementary areas of said series or the elementary areas which are symmetrical with the elementary areas of said predetermined group in relation to said centre of symmetry, the groups associated with the integration of one of the opposite voltages by the different integrators being formed of different combinations of elementary areas comprising the same number of elementary areas, which number is less than half the total number of said elementary areas in said series.

5. In a character recognition system comprising an electro-optical scanner for scanning a field including a character to be recognized on a graphical data-bearing medium, said scanner being adapted to scan elemental cells of the same shape and dimensions on said field and to derive pairs of opposite voltages each proportional to the mean shade of the scanned elemental cells, means for combining the scan-derived voltages to provide interpreted scanned signals, and means for combining said interpreted scanned signals to provide an output signal representative of said character to be recognized, the combination of a pulurality of voltage integrators, a plurality of electric switches each associated with a different one of said integrators and each adapted to assume any of a first, a second or a third state, and to transmit either one or the other of the opposite scan-derived voltages or to transmit zero voltage to the associated integrator, according to whether it assumes its first, its second or its third state, and means for controlling said scanner, said switches and said integrators synchronously to perform a plurality of cycles during the scanning of said field, said controlling means comprising first means for controlling said scanner, during each of said cycles, sequentially to scan a series of eight elemental cells positioned in a regularly spaced relationship along the inside of the perimeter of a square of fixed dimension, and on the diagonal and on the apothem thereof, and further controlling said scanner so as, in successive cycles, to move the centre of symmetry of the square to each of a plurality of spots of said field, said controlling means also comprising second means for setting each of said switches, during each of said cycles, in its first state while the scanner derives voltages from the scanning of a particular group of three consecutive elemental cells of the series, in its second state while the scanner derives voltages from the scanning of the group of three consecutive elemental cells which is symmetrical with said particular group in relation to the centre of symmetry of the square along the perimeter of which scanning is performed, and in its third state while the scanner derives voltages from the scanning of the two elemental cells of the series, not pertaining to said groups, the groups associated with the setting of different switches during each cycle being formed of different combinations of three consecutive elemental cells of the series, said controlling means further comprising third means for returning the integrators to their initial state between consecutive cycles so that each integrator, at the end of each cycle, provides a voltage proportional to the difference between the mean shade of a particular group of elemental cells and the mean shade of the group of elemental cells which is symmetrical with said particular group in relation to the centre of symmetry of the square along the perimeter of which scanning is performed during such a cycle.

6. In a character recognition system having means for scanning elementary areas of the same shape and dimensions in a field including a character to be recognized on a graphical data-bearing medium and for deriving signals each representing the valve of the mean shade of a different one of the scanned elementary areas of said field, the combination comprising means for interpreting said scan-derived signals, said interpreting means comprising a plurality of means each for selectively adding and subtracting values represented by the scan-derived signals, means for controlling said scanning means to scan a series of elementary areas of said field regularly spaced along the inside of a closed equilateral polygonal line having a centre of symmetry and means for controlling each of said selective adding and subtracting means to derive, from the signals obtained from said scanning means as the latter is controlled by said scanning controlling means, a resultant signal representing the difference of two sums, one of which is the sum of the values represented by the several signals derived from the scanning of a predetermined group of consecutive elementary areas of said series and the other of which is the sum of the values represented by the several signals derived from the scanning of the elementary areas which are symmetrical with the elementary areas of said predetermined groups in relation to said centre of symmetry, the groups associated with the control of different adding and subtracting means being formed of different combinations of elementary areas comprising the same number of elementary areas, which number is less than half the total number of said elementary areas in said series.

7. A device for analysing a zone having an equilateral polygonal perimeter with a centre of symmetry on a data-bearing medium so as to detect the existence of a difference between the mean shades of two regions of of said zone that are symmetrical with each other in relation to an axis extending through said centre of symmetry and to determine the approximate direction of such an axis which is the axis of symmetry of two such symmetrical regions exhibiting the largest difference of mean shade, said device comprising a flying spot scanner adapted to scan elemental cells of the same shape and of the same dimensions in said zone end to derive two series of opposite voltages, each of said voltages of each series being substantially proportional to the mean shade of a different one of the scanned elemental cells, a plurality of voltage integrators, a plurality of switch means each associated with a different one of said integrators and each adapted to assume a first, a second or a third state and to transmit either the scan-derived voltages of one or the other of said two series of opposite voltages or to transmit zero voltage to the associated integrator, according to whether it assumes its first, its second or its third state, and controlling means for controlling said scanner to scan a series of elemental cells positioned in regularly spaced relation along the inside of the perimeter of said zone and controlling each of said switch means to assume its first, its second or its third state while the scanner is scanning a particular group of consecutive elemental cells of said series, the group of elemental cells symmetrical with said particular group in relation to said symmetry centre, or elemental cells of said series not pertaining to said groups, the particular groups associated with the control of the different switch means being formed of different combinations of the same number of elemental cells, which number is less than half the total number of elemental cells of the series, and means for determining the largest one of the voltages obtained from said integrators after a series of elemental cells has been scanned.

8. A device for analysing a zone having an equilateral polygonal perimeter with a centre of symmetry on a data-bearing medium so as to detect the existence of a difference between the mean shade of two halves of said zone respectively located on opposite sides of an axis extending through said centre of symmetry, and to determine the approximate direction of the axis which divides said zone in two halves exhibiting the largest difference of mean shade, said device comprising means for scanning a series of elemental cells of said zone regularly spaced along the perimeter thereof, having the same shape and dimensions and having a total area forming the major part of the area of said zone, to derive voltages each proportional to the mean shade of a different one of said scanned elemental cells, a plurality of means each for deriving from the voltages provided by said scanning means a resultant voltage representing the difference between two sums, one of which is the sum of the voltages derived from the scanning of a particular group of consecutive ones of said elemental cells and the other of which is the sum of the voltages derived from the scanning of the elemental cells which are symmetrical with the elemental cells of said particular group in relation to said centre of symmetry and to a particular axis extending through said centre of symmetry, all of the groups under consideration comprising the same number of elemental cells, which number is less than half the total number of elemental cells of said series, and the particular axes under consideration for deriving a resultant voltage by different ones of said resultant voltage deriving means being different, and means for comparing the resultant voltages obtained from said plurality of resultant voltage deriving means.

9. A device for determining the approximate direction of the axis which divides a zone having an equilateral polygonal perimeter with a centre of symmetry, on a graphical data-bearing medium, into two halves exhibiting the largest difference of mean shade, said device comprising first means for measuring the difference between the mean shades of two distinct portions of said zone which form the major part of said halves, which are located along said perimeter, and which are symmetrical with each other in relation to said centre and to a first axis extending through said centre, second means for measuring the difference between the mean shades of two other distinct portions of said zone which have the same area as the first mentioned portions, which are located along said perimeter, and which are symmetrical with each other in relation to said centre and to a second axis extending through said centre, and means for comparing said measured differences.

10. A character recognition system comprising a scanning device for scanning elementary areas of a field which includes a character to be recognized, an analysing device for analysing scan-derived signals, and a control device for controlling both said scanning device and said analysing device, said control device controlling said scanning device to scan cyclically a series of elementary areas regularly spaced along a closed equilateral polygonal line having a centre of symmetry, and to move said centre sequentially to each of a plurality of spots of said field, said control device also controlling said analysing device to form, during a cycle, the sum of the scan-derived signals corresponding to a predetermined group of elementary areas of the series of elementary areas which are scanned during said cycle, and to subtract from said sum the scan-derived signals corresponding to a group of elementary areas which is symmetrical with said predetermined group in relation to said centre of symmetry, said control device including a control signal generator, adapted to assume a number of different states equal to the number of elementary areas which are scanned during a cycle, said control signal generator comprising a shift-register which has a number of stages equal to half the number of elementary areas which are scanned during a cycle, each of said stages comprising an input terminal, a direct output terminal and a complementary output terminal, the direct output terminal of each stage, except for the last stage, being connected to the input terminal of the next suceeding stage, and the complementary output terminal of the last stage being connected to the input terminal of the first stage.

References Cited by the Examiner

UNITED STATES PATENTS

| | | | |
|---|---|---|---|
| 2,754,360 | 7/56 | Dersch | 178—15 |
| 2,838,602 | 6/58 | Sprick | 178—15 |
| 2,889,535 | 6/59 | Rochester et al. | 340—149 |
| 2,959,769 | 11/60 | Greanias | 340—149 |

MALCOLM A. MORRISON, *Primary Examiner.*